United States Patent [19]

Strass

[11] 4,359,871

[45] Nov. 23, 1982

[54] METHOD OF AND APPARATUS FOR THE COOLING OF NATURAL GAS

[75] Inventor: Wilfried Strass, Neukirchen-Vluyn, Fed. Rep. of Germany

[73] Assignee: Linde Aktiengesellschaft, Wiesbaden, Fed. Rep. of Germany

[21] Appl. No.: 98,792

[22] Filed: Nov. 30, 1979

[30] Foreign Application Priority Data

Dec. 1, 1978 [DE] Fed. Rep. of Germany ....... 2852078

[51] Int. Cl.³ .................. F17D 1/04; F01K 25/10
[52] U.S. Cl. ...................... 60/648; 48/191; 48/196 R; 52/290; 60/649
[58] Field of Search ............ 60/648, 649; 48/196 R, 48/191; 290/52

[56] References Cited

U.S. PATENT DOCUMENTS

| | | | |
|---|---|---|---|
| 2,433,896 | 1/1948 | Gay | 290/52 X |
| 2,740,701 | 4/1956 | Tenney, Jr. | 48/191 X |
| 2,873,180 | 2/1959 | Gilbert | 48/191 |
| 4,077,748 | 3/1978 | Potz | 290/52 X |

*Primary Examiner*—Allen M. Ostrager
*Attorney, Agent, or Firm*—Karl F. Ross

[57] ABSTRACT

A method of cooling natural gas in a system in which the natural gas contains components other than methane which are separable by dewpoint condensation and the natural gas is available from a source, e.g. a well, at an elevated pressure. In accordance with the present invention, the natural gas is initially expanded in a work-producing expansion turbine to cool the natural gas to a temperature below the dew point of the components to be separated and the portion of the natural gas remaining after separating these components is compressed in a compressor which can in part be driven by the turbine so that at least a portion of the work output of the turbine is at least in some cases utilized for compressing the methane-containing portion which can be forced under pressure into a pipeline. In dependence upon the variable pressure difference between the input of the expansion turbine and the output of the compressor, energy is recovered from the turbine or supplied to the set formed by the turbine and compressor and the compression of the expanded methane-containing portion is effected after heat exchange with the natural gas to be expanded and/or is directly carried out at the expansion temperature.

9 Claims, 3 Drawing Figures

METHOD OF AND APPARATUS FOR THE COOLING OF NATURAL GAS

FIELD OF THE INVENTION

My present invention relates to a method of and an apparatus for the cooling of natural gas and, more particularly, to a dewpoint separation method and apparatus whereby natural gas from a subterranean source, e.g. a well, is recovered at an elevated pressure, components of the natural gas other than methane are removed by reducing the temperature of the natural gas below the dew point of these components, and the balance (remainder) of the natural gas, i.e. primarily the methane, is recompressed for delivery to a system in an elevated pressure, e.g. a distribution or transportation pipeline.

BACKGROUND OF THE INVENTION

Natural gas at natural-gas wells or the wellheads of petroleum recovery installations frequently contains, as will be discussed in greater detail, below, components which can be removed from the natural gas and which may be valuable in their own right, for example, higher molecules weight hydrocarbons. Furthermore, the natural gas is at an elevated pressure at such sources, the latter term being used to refer to any location at which natural gas is capable of undergoing a dewpoint separation of selected components, available at an elevated pressure.

The term "dewpoint separation" as used herein will be understood to refer to a system (method or apparatus) wherein a gas mixture is cooled to a temperature below the dewpoint of a component to be recovered, so that this component condenses from the gas and is thereby separated out.

Mention may also be made herein to a "consumer" for the natural gas fraction from which condensible components have been removed by dewpoint separation and this expression will be used to mean any system which is capable of utilizing natural gas or transporting the same away from the dew point separator. For example, the consumer may be a pipeline or a distribution network for natural gas or methane, a liquefaction plant producing liquid methane, a transport pipeline for carrying the remaining natural gas long distances, or the like.

It is already known to cool natural gas, which appear at an elevated pressure at the source, by expanding it in an expansion turbine and thereafter separating out the condensible components, prior to pressurizing the balance, i.e. the "lean" or methane portion, and feeding the compressed gas portion to a pipeline.

The expansion turbine here functions, as in any expansion system, as a cooling device, differing from free expansion in that the pressurized gas expands against a rotatable member, i.e. the turbine rotor. Expansion turbines are capable of doing work, i.e. of converting the expansion of the gas into useful work in the sense that potential energy represented by the gas pressure is transformed into kinetic energy of the motion of the turbine rotor which can be connected to a load for doing work which can be utilized elsewhere in the plant.

In this sense the "work expansion" of a gas is capable of transforming the otherwise useless or wasted energy of a gas at elevated pressure into useful energy and at the same time bring about the expansion which is desired for cooling purposes.

The principle of generating cold by the work expansion of a gas has, of course, long been known and is used in a variety of air and gas rectification systems, i.e. systems resulting in the low-temperature separation of air and other gases into components by, for example, condensation at least in part.

As a consequence, practically all high-capacity gas rectification systems of this type utilize expansion turbines, generally in the form of radial turbines, which are driven by the passage of the expanding gas from the exterior toward the interior.

The work which is generated by the expanded gas is generally recovered by coupling the turbine rotor to an electric-current generator through a transmission, the electrical power of the generator being applied to the plant's electrical network or being supplied to another current-distribution network in proximity to the plant.

However, in conjunction with the generation of electrical energy or as an alternative thereto, it is also possible to dissipate the kinetic energy of the rotor or to produce useful work by connecting the rotor shaft to a fluid-circulator pump, a torque converter or hydrodynamic brake, an air brake or, as is most commonly the case, to a compressor for generating a gas pressure useful elsewhere in the system.

In the latter case, the free end of the turbine shaft is connected to a turbocompressor rotor.

In order to ensure thermal insulation of the expansion-turbine rotor from the turbocompressor rotor the two rotors are generally provided on opposite unsupported ends of a common shaft, within respective housings which are separated by the bearing and seal system which rotatably supports the shaft (whose free ends are cantilevered on the bearings) and any seals between the two housings and the exterior as may be required.

This construction frequently provides a tachometer between the two housing to measure the speed of the shaft and is an extremely expensive structure having the disadvantage that it cannot be operated efficiently in all cases. For example, the turbine and compressor outputs must be precisely dimensioned with respect to one another under all operating conditions of the system.

Such expansion turbine-compressor sets have been used heretofore also in the cooling of natural gases in dewpoint installations or in other systems for the separation of gas-mixture components, e.g. heavier hydrocarbons from the methane of natural gas or the outflow of refineries, chemical plants, metallurgical plants and the like.

Using the principles described above, the natural gas at source pressure is expanded in the expansion turbine and the component consisting predominantly of methane, is compressed for introduction into the pipeline. While the latter component, referred to as a "lean" component because of its reduced concentration of heavier hydrocarbons, consists predominantly of methane, it may nevertheless contain other components and hence it may be more accurate to speak of it as a "lean natural gas."

With reduced natural gas source pressure, the pressure differential between source pressure and consumer pressure (pressure at the discharge side of the compressor) may become so small that the temperature drop which must be brought about by the expansion may be insufficient to effect the dewpoint separation of the high molecular weight components. In such cases, it is known to make use of a refrigerating system, e.g. a propane refrigerant installation to effect exterior cooling of the gases before or upon expansion or even after expansion, or to use systems which increase the pressure differential, e.g. by precompressing the natural gas before expansion. Obviously all of these systems are uneconomical from an energy viewpoint and render the process more complex and expensive.

OBJECTS OF THE INVENTION

It is the principal object of my present invention to provide an improved method of and apparatus for the cooling of natural gas whereby the disadvantages of earlier systems can be avoided.

Another object of the invention is to provide a method of cooling natural gas as part of a dewpoint separation, whereby the operations can be more precisely matched to the operating parameters which are met in practice, thereby increasing the energy efficiency of the plant without significant additional cost.

It is yet another object of the invention to provide an improved apparatus for the purposes described which can accommodate the cooling of natural gas to the thermodynamically most efficient method, thereby simplifying and making more economical the cooling and dew point separation of natural gas.

SUMMARY OF THE INVENTION

These objects and others which will become apparent herein after are attained, in accordance with the present invention in a method of cooling natural gas wherein the natural gas is introduced at source pressure into an expansion turbine for the work expansion of the natural gas and, after separation of the condensed component by dewpoint separation, the lean natural gas is compressed for delivery to a consumer (pipeline) in the manner described, the invention comprising detecting the variable pressure difference between the input to the expansion turbine and the output of the compressor and, in accordance with the pressure difference, drawing energy from the expansion turbine or supplying energy to the set constituted by the expansion turbine and the compressor, and passing the expanded natural gas in heat exchange with the gas to be expanded prior to compression and/or carrying out the compression directly at the temperature produced in the lean natural gas by the expansion step. In other words, the compression of the component of the original mixture which is to be delivered to the consumer is effected after heat exchange with the natural gas to be expanded (input gas) and/or directly at the expansion-generated temperature.

The method of the invention can be carried out in a dewpoint separator for natural gas in which the expansion turbine and compressor form a set whose rotors are coupled by a common shaft, initially with power equilibrium between the expansion turbine and the compressor, i.e. the compression energy is equal to the work produced by the expansion turbine for the most common conditions of pressure of the input gas and the output gas. With reduced source pressure, an additional drive can be supplied to the set whose power is increased as the source pressure drops, i.e. in accordance with the requirement that the temperature resulting from the expansion will be effective to condense out the higher molecular weight hydrocarbons. The reduction of the turbine counterpressure with reduction of the input pressure thus can maintain the pressure drop across the turbine and hence the temperature drop in the turbine constant. The pressure increase in the compressor is thus supplied by the additional power. The additional power can be delivered, for example, by an electrical motor connected by a transmission to the shaft of the turbine-compressor set or exclusively to the compressor, by a gas turbine, a steam turbine, another gas expansion turbine for locally required low pressure gas or the like.

Should the source pressure increase to result in a greater pressure differential between the input and output pressures of the system, the output, in terms of work, of the expansion turbine becomes greater than that required for the compressor and an additional load can be coupled to the set or to the expansion turbine. This additional load may be an electrical-current generator.

The recompression of the expanded natural gas fraction subsequent to separation of the high molecular weight component, i.e. the lean natural gas fraction, in accordance with the present invention, has several advantages.

For example, the lean fraction after separation of the high molecular weight components, can be first passed in heat exchange with the input natural gas and thereby can contribute "cold" energy to the natural gas prior to expansion thereby allowing lower source pressures to achieve the desired dewpoint temperature for removal of the high molecular weight components. Simultaneously the lean fraction is warmed to the temperature in the pipeline to which it may be delivered.

However, it is frequently advantageous to recompress the lean fraction at the temperature to which it has been cooled by expansion, thereby reducing the energy which must be contributed by the compressor for a given degree of compression and output pressure. This is because the recompression of a cold gas is energetically more advantageous than the compression of warm gas. When the temperature of the gas fed to the compressor is lower, not only does the gas at the output side of the compressor have a lower temperature but less energy is required to drive the compressor.

Either of these two alternatives, or a combination of both may be used depending upon the detected pressure differential, thereby deriving advantages in part from both. In other words, a portion of the expanded lean fraction can be passed in heat exchange with the input natural gas while the remainder is compressed directly. Preferably the lean natural gas after heat exchange and the lean natural gas at the expansion temperature are mixed before compression.

When the lean expanded natural gas is compressed at the temperature generated by the expansion, it is advantageous, in accordance with a feature of the invention, to pass the compressed lean fraction in heat exchange with the natural gas to be expanded so that any residual cold energy can be transferred to the input gas in a precooling stage for the latter. This permits the desired low temperature upon expansion to be achieved even with reduced source pressures. The compression of the lean natural gas should be effected to a pressure appropriate to the consumer, e.g. the pressure at which this gas is to be supplied to the pipeline, with the pressure drop in any heat exchanger following the compressor being compensated for by a greater degree of compression.

With especially low source pressure, it has been found to be advantageous to subject the compressed lean natural gas fraction, prior to heat exchange with the gas to be expanded, to cooling from an externally supplied cooling source, thereby enabling the compressed fraction to be passed in a relatively cold state in heat exchange with the input gas and correspondingly cool the latter. The low temperature required at the output side of the expansion turbine can thus result even at low pressures with this expedient. The externally supplied cold can be delivered by an auxiliary cooling cycle operated with propane.

In order to minimize energy consumption, it has been found advantageous, even with low source pressures, to supply cold from a foreign source directly to the natural gas to be expanded, i.e. without supplying cold from the propane auxiliary coolant cycle to the compressed fraction. This can apply whether or not the compressed lean fraction is passed in heat exchange with the input gas to be compressed.

An apparatus for carrying out the process of the present invention can comprise an expansion turbine connected by a conduit with a source of the natural gas at source pressure and a compressor coupled with the expansion turbine and having its output side communicating with a consumer such as the previously mentioned pipeline. The rotors of the turbine and the compressor can be mounted on a common shaft. According to the invention, the turbine-compressor set is provided with gas inlet and outlet fittings respectively for the turbine and the compressor. The outlet fitting of the turbine communicates via a duct with the separator for the high molecular hydrocarbons and with a heat exchanger, if desired, connected with the inlet fitting to the turbine. The other side of this heat exchanger or the outlet of the separator or both are connected to the inlet fitting of the compressor.

The compressor can have more than one compressor stage and hence the term "compressor rotor" can refer to a plurality of compressor rotors mounted upon the common shaft.

According to the invention, moreover, both the turbine rotor and the compressor rotor are disposed on the common shaft between the ends thereof at which bearings can journal the shaft in the housing. At least at one end, this shaft extends out of the housing axially for connection to a generator and/or a driving motor (e.g. a machine capable of acting as both).

This construction of the expansion turbine and compressor set has the advantage that energy can be put into the system or taken out of the system via the free end of the shaft which extends out of the housing so that the advantageous thermodynamic results discussed above can be obtained.

For example, with a diminishing source pressure the expansion turbine and compressor need not be operated in power equilibrium and the attainment of the desired output pressure at the compressor need not be limited by the operating characteristics of the expansion turbine.

The electric motor or other drive can be coupled to the free end of this shaft to feed energy into the set or the generator can be coupled to the free end of the shaft, or to another free end thereof extending out of the housing, to draw energy from the set.

When the system is used as a natural gas dewpoint separating system, the set should be constructed so that the compressor and the expansion turbine are in power equilibrium at least for the most common conditions of source pressure and compressor output pressure. However, deviations from these requirements can be accommodated by energy supply or withdrawal at low cost and in a simple manner. This is greatly facilitated by extending the shaft out of the housing for connection to the drive or load and providing the bearings at ends of the housing.

When energy must be supplied to the system, it has been found to be advantageous not only to provide an electric motor but also to couple a fluid machine such as a gas turbine or a steam turbine to the free end of the shaft of the set to increase the versatility of the system.

To permit the expansion turbine to generate the desired low temperature state of the incoming natural gas, it is desirable, with reduced source pressures, to minimize the counterpressure or back pressure at the expansion turbine. This can be facilitated by disposing the rotors of the expansion turbine and the compressor so that they are traversed in the same or in the opposite flow directions and/or constructing the units so that the vanes of the nozzle ring of the expansion turbine and the inlet guide vanes of the compressor are adjustable. While this can be achieved by replacement of the compressor rotor or adjustment of the inlet guide vanes of the compressor or by a combination thereof to modify the power draw of the compressor with varying operating parameters it is most advantageous to construct the compressor as a variable power draw unit enabling automatic or external adjustment of the power draw conditions in accordance with these operating conditions. Similarly, automatic or external adjustment of the guide vanes in the nozzle ring of the expansion turbine can be provided to adjust the operating parameters through the throughput and vice versa.

For an uncomplicated and low maintenance construction of the turbine-compressor set, it has been found to be advantageous to construct the housing as a pot-shaped or cup-shaped structure with covers at opposite sides through which the shaft ends pass and which retain the bearings journaling the shaft on opposite sides of the rotors. The bearings are thus accessible from the exterior and from the respective ends.

An important advantage of this construction is that the bearings can lie outwardly of the gas chambers of the expansion turbine and compressor so that separation of the lubricate bearings from the gas chambers is facilitated and the introduction of oil into the gas is avoided.

Furthermore, since the bearings can be arranged on external portions of the housing covers, the portions carrying the bearings may be readily replaced without serious downtime and without opening the turbine or compressor housings themselves. The rotors and shaft as an assembly can also be removable as a unit, together with portions defining the compressor and turbine compartments. Alternatively, the compressor or the turbine can be removed individually, leaving the shaft system intact and without unnecessarily opening the other.

To seal the bearing compartments against the gas chambers, sealing means in the form of labyrinth seals, floating-ring seals or rotating bushing or gland seals may be used. In general, any one or more of the sealing arrangements conventionally used around rotating shafts or gas locks and oil/gas separating seals can be employed. Best results are, however, obtained by a combination of oil-lubricated sliding ring seals and gas-blocking seals capable of maintaining a gas pressure limiting lubricant flow along the shaft in the region of the seal. The ring seal can be supplied with the lubricating oil by the oil circulation system of the turbine-compressor set while the gas seal can be connected to a compartment of slightly elevated pressure to minimize the influx of oil and ensure that the leakage oil will be forced outwardly rather than into a compartment of the turbine or compressor.

The construction of the turbine-compressor set with at least one axial end of the shaft extending from the housing has the further advantage that a precompressor can be connected to this shaft to feed precompressed natural gas to the inlet of the expansion turbine, thereby increasing the pressure at this inlet to counter falling source pressure.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLES

Figure 1:
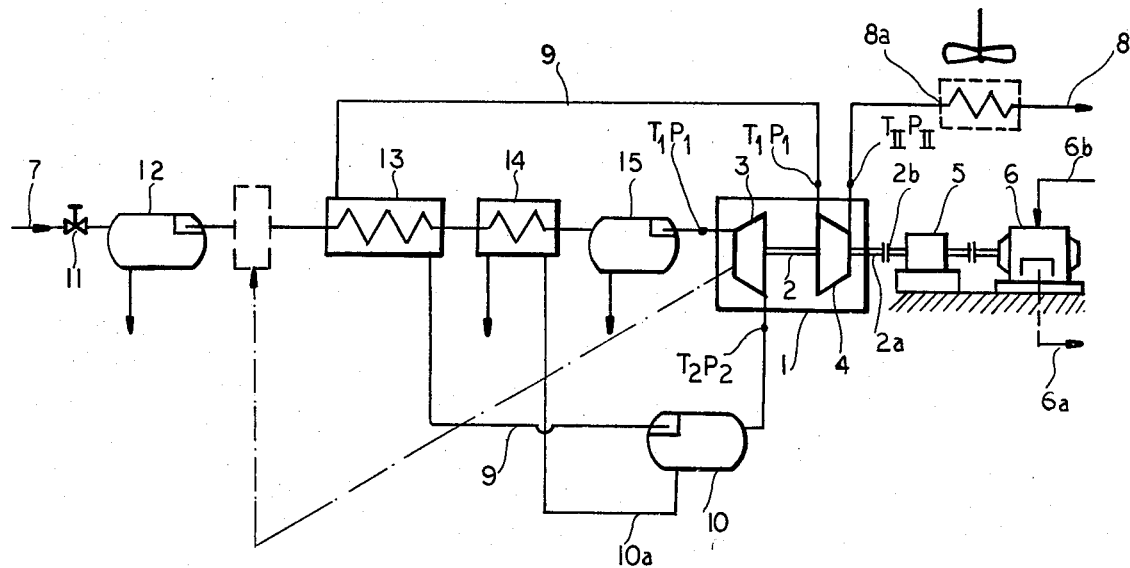
FIG. 1 is a flow diagram illustrating a dewpoint separating system for natural gas operated in accordance with the principles of the present invention.
Figure 3:
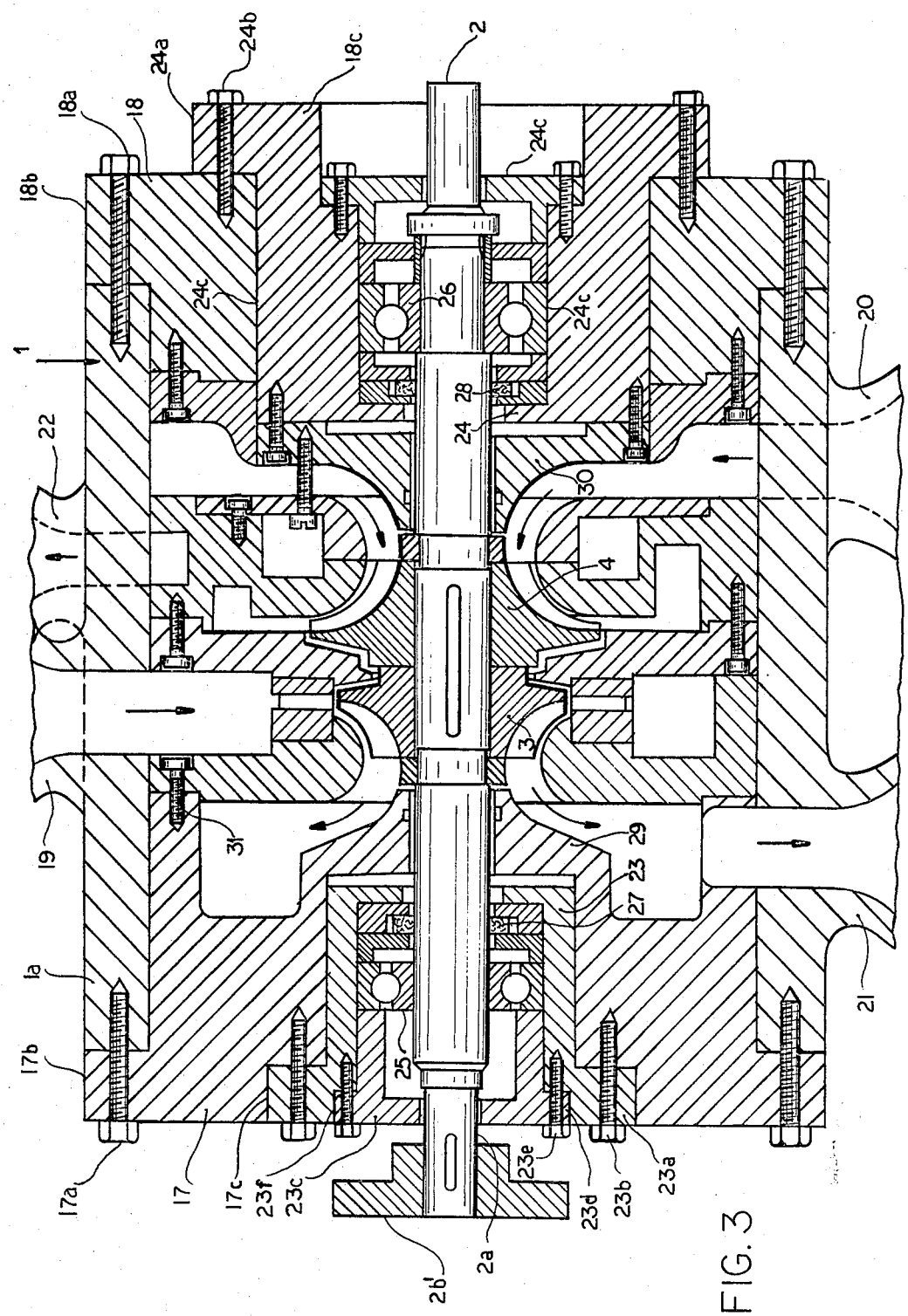
FIG. 3 is an axial cross-sectional view, partly in diagrammatic form through a turbine-compressor set adapted to be used in the method of the invention.

FIG. 1 of the drawing shows a housing 1 for the turbine-compressor set which comprises a common shaft 2 supported at its ends by bearings in the manner illustrated in FIG. 3 and not shown here in detail.

At one end 2a the shaft 2 is extended out of the housing 1 and can be coupled, e.g. via disconnectable clutch 2b to a transmission 5 and by the latter to the shaft of a motor generator 6. The electrical machine 6, when its shaft is driven, functions as a generator to supply electric current to the plant network or some other electrical distributing system as represented at 6a. When electric power is supplied, as represented by the arrow 6b, the machine 6 functions as a motor to drive shaft 2.

The turbine-compressor set comprises a turbine rotor 3, illustrated diagrammatically, mounted on the shaft 2 and a compressor rotor 4 likewise mounted on the shaft 2.

A feed line 7 for natural gas from any desired source, e.g. a well, from which the natural gas arrives at an elevated pressure, serves as the input to the system while an outlet conduit 8 draws the product to a consumer such as a pipeline at an elevated pressure.

Between the expansion turbine and the compressor, a further line 9 is provided, representing the path connecting the output side of the turbine with the input side of the compressor.

In the embodiment shown in FIG. 1, the connection 9 between the output side of the turbine 3 and the input side of the compressor 4 passes initially through a separator 10 from which high molecular weight hydrocarbons, condensed by dewpoint cooling in the expansion turbine, are separated from the gaseous phase, i.e. the lean methane-containing fraction.

The natural gas to be expanded first passes the valve 11 and a separator 12 from which condensate arising in or ahead of the valve 11, is separated out of the natural gas which is then cooled in an indirect heat exchange 13 formed along the flow path 9 between the separator 10 and the input side of the compressor 4. The expanded lean fraction thus is warmed prior to compression and serves to precool the natural gas to be expanded.

The precooled natural gas then passes through a second heat exchanger which is cooled by the liquid phase collected in the separator 10 and passes through the heat exchanger via the line 10a. If desired, the liquid phase can be forced through an expansion nozzle into the heat exchanger 14.

The prior cooling of the natural gas to be expanded may give rise to further quantities of condensate which are separated from the natural gas in the separator 15 upstream of the expansion turbine 3. In the expansion turbine, the natural gas is work expanded while driving the turbine and has its temperature thereby lowered below the dewpoint of the condensible to be collected in separator 10. The lean mixture, after heat exchange in the manner described is compressed in the compressor 4, at least in part driven by the turbine 3, to pressure required in the pipeline to which line 8 leads. A further heat exchanger or cooler 8a in line 8 serves to remove compression heat and match the temperature of the compressed gas to that of the pipeline.

Figure 2:
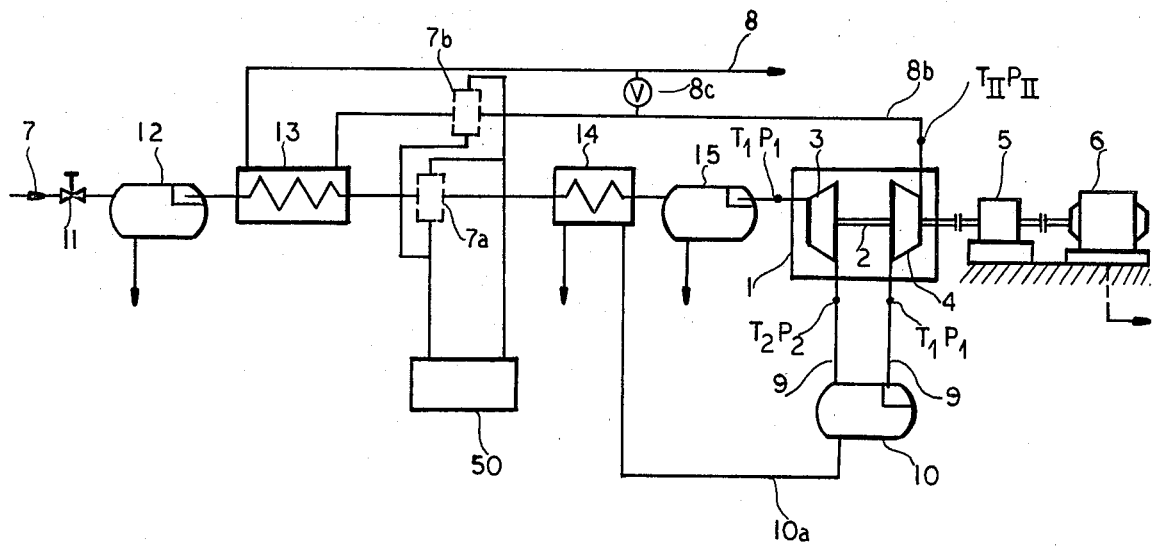
FIG. 2 is a flow diagram of another embodiment of the invention.

In FIG. 2, in which parts identical to those of FIG. 1 have the same reference numerals, the connection 9 between the output of the expansion turbine 3 and the input of the compressor 4 passes through the separator 10 exclusively, the gas phase being delivered to the compressor directly. In this embodiment, however, the liquid phase from the separator 10 is fed at 10a to the heat exchanger 14 for a second stage precooling of the natural gas to be expanded. Furthermore, the compressed gas is fed via line 8b to the first stage precooler 13 before being delivered at 8 to the pipeline.

Naturally, combinations of the systems of FIGS. 1 and 2 can be used as well, i.e. a portion of the compressed gas can bypass the cooler 13 under the control of a valve 8c and/or the heat exchanger 13 can be formed with a number of sections so that both modes of operation discussed in connection with FIGS. 1 and 2 may be carried out simultaneously. The system of FIG. 2 has the advantage over that of FIG. 1 in that the compression in FIG. 2 is carried out more efficiently since compression of cold gas is energetically more efficient than of a warm gas.

It should be understood that, apart from the modes of operating the apparatus already described, there are other possibilities which may be chosen as occasion arises.

For example, a further cooling stage may be provided downstream of the heat exchanger 13 as an additional cooler to which externally supplied cold can be delivered. This is represented by a heat exchanger 7a in FIG. 2 of a propane refrigerating cycle 50. Naturally, a heat exchanger 7b in line 8b can be provided if desired to deliver the externally supplied cold to the gas which is to pass through the heat exchanger 13.

In addition, a precompressor 7c can be disposed downstream of the separator 12 in either of the embodiments and can be connected to the turbine-compressor set 3, 4 at one of the shaft ends thereof to precompress the natural gas with reduced source pressure.

The following three numerical examples show the results obtained with the system illustrated in FIG. 1 under three different conditions. Example 1 deals with the case in which excess energy is recovered from the system by the generating of electric power. The second case (example 2) shows the expansion turbine and the compressor in power equilibrium. The third example (3)

illustrates the case in which a reduced source pressure requires the supply of energy to the system.

In all cases a turbine-compressor set is used which can operate with variable source pressure and has a maximum output (compressor) pressure of $P_{II}=77$ bar. The expansion temperature $T_2(K)$ is 233 K in all cases which results in a condensate recovery in the separator 10 of about 11% of the throughput of the expansion turbine (by volume).

For each example, the respective source pressure $P_q$ and the pressure $P_1$ and respective temperature $T_1$ of the natural gas to be expanded at the inlet to the expansion turbine is as indicated in the drawing.

The following parameters also can be discerned from the tabulated results below.

The expansion pressure $P_2$ equals the compressor inlet pressure $P_I$, the compressor temperature at the outlet $T_{II}$ is given in degrees K and the power supplied by or derived from the machine 6 is also stated.

TABLE

| Example | $P_Q$ bar | $P_1$ bar | $T_1$ (K) | $T_2$ (K) | $P_{II}$ bar | $P_2 \approx P_I$ bar | $T_{II}$ (K) | Recovered Power (kW) | Supplied Power (kW) |
|---|---|---|---|---|---|---|---|---|---|
| 1 | 180 | 175 | 286 | 233 | 77 | 60 | 337 | 1400 | — |
| 2 | 144 | 140 | 272 | 233 | 77 | 60 | 337 | 0 | 0 |
| 3 | 106 | 102 | 258 | 233 | 77 | 60 | 337 | — | 1100 |

As you can see from the table with a relatively low source pressure, the low temperature $T_2$ of 233 K which is required can be achieved by supplying 1100 kW. If the source pressure drops further, additional cooling in the manner described is required for the gas to be expanded.

FIG. 3 illustrates an embodiment of the present invention in the form of a turbine-compressor set which has its turbine rotor 3 and its compressor rotor 4 mounted close to one another on the common shaft 2.

The housing 1 is formed as a cup-shaped structure with a cylindrical outer casing 1a provided with the turbine inlet fitting 19, the compressor outlet fitting 22, the turbine outlet fitting 21 and the compressor inlet fitting 20, respectively.

The opposite ends of the housing 1 are closed by covers 17 and 18 held in place by bolts 17a and 18a, respectively, through the flanges 17b and 18b of these covers.

The fittings 19, 21 and 20, 22 are in communication with the turbine and compressor spaces within the housing respectively.

The covers 17 and 18 are provided with bearing-mounting and sealing sleeves 23 and 24 which are respectively flanged at 23a and 24a so that bolts 23b and 24b can secure these flanges in respective recesses 17c and 18c of the covers.

The bearing housing 23 receives a diagrammatically illustrated roller bearing set 25 for the left-hand end of the shaft 2 which can project at 2a out of the housing and can be formed with a coupling 2b forming part of the coupling or clutch 2b mentioned previously. The bearing assembly is held in place by a cap 23c whose flange 23d is bolted at 23e in a recess 23f of the bearing housing 23. At the opposite end of the shaft, the bearing 26 is mounted directly in a bore 24c of the bearing housing and is held in place by a bolted cover 24d. The diameter of the cylindrical portion 24e of housing 24 can equal that of a housing portion 30 described below and forming part of a pressurized gas seal or gas gate. The rotors can be of smaller diameter.

The shaft retainers 23 and 24, supporting the bearings 25 and 26 of the shaft 2, are so arranged that the bearings 25 and 26 are accessible and removable without the need to remove the housing covers 17 and 18. The left-hand bearing 25 may be axially withdrawn while the right-hand bearing 26 can be fixedly retained in the respective covers. This construction allows at least one end of the shaft to be connected to the electrical machine which can function as both a generator and motor in the manner described. The parts of the compressor and/or the expansion turbine can be removed without disconnecting the member 1a or the fittings 19 through 22 from their respective conduits.

To this end the cover 18 can be removed and all of the internal parts detached from one another by the respective bolts and withdrawn through the right-hand end of the housing.

More specifically, the fixed bearing 26, the shaft 2 and the rotors carried by the shaft can simply be withdrawn with the cover 18. Only a portion of the guide structure of the expansion turbine then remains and this portion can be withdrawn by disconnecting the bolts 31 connecting it with the other cover 18.

The seals 27 and 28 between the respective bearings and the rotors are rotating ring oil or gas lubricated seals, the gas-lock forming members 29 and 30 providing gas pressure seals which prevent inflow of any lubricant.

To connect the set of FIG. 3 in the systems of FIGS. 1 and 2, it is only necessary to connect the gas inlet fitting 19 with line 7, the gas outlet fitting with a separator 10 and its line 9 with the gas inlet fitting 20. The gas outlet fitting 22 is connected with line 8 and the outwardly extending end of the shaft is coupled to the electrical machine 6.

I claim:

1. A method of cooling natural gas derived from a source at an elevated pressure and supplying a consumer with a compressed portion of the natural gas, said method comprising the steps of:

work expanding the natural gas derived from said source in an expansion turbine to cool the natural gas to a temperature below the dew point of a component thereof, thereby condensing said component;

separating the condensed components from the remainder of the natural gas;

compressing said remainder of the natural gas in a compressor coupled to said turbine and forming a set therewith, the compressed remainder of the natural gas being delivered to said consumer; and controlling the expansion and compression of the gas in response to variable pressure differences between an input to said expansion turbine and an output of said compressor by withdrawing energy beyond that required for said compressor, supplying energy to said set upon the source pressure diminishing to a level precluding condensation of said component and carrying out the compression of said remainder of said natural gas selectively directly at the expansion temperature or after heat exchange with the gas to be fed to said input.

2. The method defined in claim 1 which comprises the step of passing at least a portion of said remainder of said portion of said natural gas compressed at the temperature generated by expansion in indirect heat exchange with the natural gas prior to expansion in said turbine.

3. The method defined in claim 1 or claim 2, further comprising the step of supplying cold from an external source to the natural gas prior to expansion in said turbine.

4. An apparatus for the cooling of natural gas, comprising;
a housing;
a turbine received in said housing, said housing being formed with inlet and outlet fittings, said inlet fitting being connectible to a source of natural gas at an elevated pressure whereby expansion of said natural gas drives said turbine rotor and cools the natural gas to a temperature below the dew point of a component thereof;
a separator connected to said outlet fitting for separating said component from the remainder of the natural gas;
a compressor rotor received in said housing, said housing being provided with a compressor input fitting and a compressor output fitting receiving said remainder of said natural gas and said output fitting being connectible to a consumer thereof;
a common shaft disposed in said housing and carrying said rotors, said shaft having at least one axial end projecting out of said housing;
at least one electrical machine connected to said end of said shaft for selectively abstracting energy therefrom and supplying energy thereto; and
respective bearings disposed on opposite sides of said rotors with said rotors disposed between said bearings for journaling said shaft and said rotors in said housings.

5. The apparatus defined in claim 4, further comprising means for varying the power generated by said expansion turbine and consumed by said compressor.

6. The apparatus defined in claim 4 wherein said housing comprises a cylindrical member open at opposite ends and respective covers closing said ends of said housing and each receiving a respective one of said bearings.

7. The apparatus defined in claim 6, further comprising a respective sealing assembly between each bearing and said rotors, each sealing assembly including a lubricated ring seal and a gas seal.

8. The apparatus defined in claim 7 wherein said shaft has an end connectible to a precompressor for compressing the natural gas delivered to said inlet fitting.

9. The apparatus defined in claim 7 wherein each of said covers is formed with an outwardly open recess and with a flanged sleeve retaining the respective bearing in said recess.

* * * * *